US011447271B2

(12) United States Patent
Somanath et al.

(10) Patent No.: US 11,447,271 B2
(45) Date of Patent: Sep. 20, 2022

(54) AIRCRAFT COMPONENT REPAIR SCHEDULING SYSTEM AND PROCESS

(71) Applicant: United Technologies Corporation, Farmington, CT (US)

(72) Inventors: Nagendra Somanath, South Windsor, CT (US); Kurt R. Heinemann, East Hampton, CT (US); Evan Selin, Rocky Hill, CT (US); Glenn Levasseur, Colchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 266 days.

(21) Appl. No.: 16/376,324

(22) Filed: Apr. 5, 2019

(65) Prior Publication Data
US 2020/0317371 A1    Oct. 8, 2020

(51) Int. Cl.
*B64F 5/60*    (2017.01)
*B64F 5/40*    (2017.01)
(Continued)

(52) U.S. Cl.
CPC ............ *B64F 5/60* (2017.01); *B64F 5/40* (2017.01); *F01D 21/003* (2013.01); *G01M 15/14* (2013.01); *G07C 5/0808* (2013.01)

(58) Field of Classification Search
CPC ..... F01D 21/003; G01M 15/14; G07C 5/0808
See application file for complete search history.

(56) References Cited

U.S. PATENT DOCUMENTS

| 6,408,258 B1* | 6/2002 | Richer | B64F 5/60 |
| | | | 702/182 |
| 8,788,312 B2* | 7/2014 | Wetzer | G06Q 10/063112 |
| | | | 705/7.26 |

(Continued)

FOREIGN PATENT DOCUMENTS

| EP | 2175336 | 4/2010 |
| EP | 3457340 | 3/2019 |

OTHER PUBLICATIONS

European Search Report for Application No. 20167794.5 dated Aug. 6, 2020.

*Primary Examiner* — James J Lee
*Assistant Examiner* — Wenyuan Yang
(74) *Attorney, Agent, or Firm* — Carlson, Gaskey & Olds, P.C.

(57) ABSTRACT

A maintenance scheduling system for gas turbine engine components includes a computer system configured to receive a set of measured parameters for each gas turbine engine component in a plurality of substantially identical gas turbine engine components, and determine a variation model based on the set of measured parameters. Each of the gas turbine engine components is a single route component and has been utilized in a substantially identical single route. The computer system includes at least one simulated engine model. The simulated engine model is configured to determine a predicted operation of each gas turbine engine component in the plurality of substantially identical gas turbine engine components. A correlation system is configured to correlate variations in the set of parameters for each of the gas turbine engine components in the plurality of substantially identical gas turbine engine components with a set of the predicted operations of each gas turbine engine component in the plurality of substantially identical gas turbine engine components, thereby generating a predictive (Continued)

model based on the variations. A maintenance schedule module is configured determine a predictive model operable to determine a predicted wear pattern of a second single route component that is substantially identical to the gas turbine engine components.

22 Claims, 7 Drawing Sheets

(51) Int. Cl.
*F01D 21/00* (2006.01)
*G01M 15/14* (2006.01)
*G07C 5/08* (2006.01)

(56) References Cited

U.S. PATENT DOCUMENTS

| | | | |
|---|---|---|---|
| 2006/0188374 A1* | 8/2006 | Mickol | F04D 29/662 |
| | | | 416/219 R |
| 2008/0027686 A1* | 1/2008 | Mollmann | F01D 5/26 |
| | | | 703/2 |
| 2010/0089067 A1* | 4/2010 | Wilkes | G05B 23/0254 |
| | | | 60/773 |
| 2017/0323274 A1* | 11/2017 | Johnson | G05B 23/0251 |
| 2017/0323403 A1* | 11/2017 | Johnson | G06Q 50/14 |
| 2018/0284737 A1* | 10/2018 | Cella | G05B 19/4185 |
| 2019/0156600 A1* | 5/2019 | Potyrailo | B61C 17/08 |
| 2020/0079532 A1* | 3/2020 | Rix | G06N 20/20 |
| 2021/0157312 A1* | 5/2021 | Cella | G05B 23/0291 |

* cited by examiner

AIRCRAFT COMPONENT REPAIR SCHEDULING SYSTEM AND PROCESS

TECHNICAL FIELD

The present disclosure relates generally to a process for repairing gas turbine engine components, and more specifically to a process for determining maintenance schedule for a single route component.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via one or more shaft, the rotation of the turbine section further drives the compressor section to rotate. In some examples, a fan is also connected to the shaft and is driven to rotate via rotation of the turbine as well.

Any given gas turbine engine is constructed of a significant number of individually manufactured components. Among the individually manufactured components can be blades, vanes, panels, outer air seals, and the like. In some cases, such as with a compressor rotor or a fan, multiple substantially identical components can be utilized in a single engine assembly.

Engine operations within varied regions can have substantial impacts on component life cycles due to the engine operations and service conditions in extreme regions. By way of example, sand ingestion in hot climates can result in faster damage to individual airfoils due to pitting. In an alternate example, an extremely cold operation zone may result in minimal pitting, but damage could be localized to supply lines that are subjected to substantially more freeze/thaw cycles than in the hot environment.

SUMMARY OF THE INVENTION

In one example a maintenance scheduling system for gas turbine engine components includes a computer system configured to receive a set of measured parameters for each gas turbine engine component in a plurality of substantially identical gas turbine engine components, and determine a variation model based on the set of measured parameters wherein each of the gas turbine engine components is a single route component and has been utilized in a substantially identical single route; the computer system including at least one simulated engine model, the simulated engine model being configured to determine a predicted operation of each gas turbine engine component in the plurality of substantially identical gas turbine engine components; a correlation system configured to correlate variations in the set of parameters for each of the gas turbine engine components in the plurality of substantially identical gas turbine engine components with a set of the predicted operations of each gas turbine engine component in the plurality of substantially identical gas turbine engine components, thereby generating a predictive model based on the variations; and a maintenance schedule module configured determine a predictive model operable to determine a predicted wear pattern of a second single route component, wherein the second single route component is substantially identical to the gas turbine engine components.

In another example of the above maintenance scheduling system, the plurality of substantially identical gas turbine engine components are manufactured via a single manufacturing process.

In another example of any of the above maintenance scheduling systems, the maintenance schedule module is configured to determine a maintenance schedule of the second single route component based on the predicted wear pattern.

In another example of any of the above maintenance scheduling systems the maintenance schedule includes a length of time until the second single route component is due for maintenance.

In another example of any of the above maintenance scheduling systems the maintenance schedule includes a predicted repair method, the predicted repair method being a repair method configured to place the second single route component within qualification parameters.

In another example of any of the above maintenance scheduling systems the predicted repair method includes a specific repair operation.

In another example of any of the above maintenance scheduling systems the plurality of substantially identical gas turbine engine components includes at least 25 substantially identical turbine engine components.

In another example of any of the above maintenance scheduling systems the plurality of substantially identical gas turbine engine component includes at least 200 substantially identical turbine engine components.

In another example of any of the above maintenance scheduling systems the predictive model is a set of mathematical functions, each of which relates at least two parameters of the set of measured parameters for each gas turbine engine component.

In another example of any of the above maintenance scheduling systems the maintenance schedule module is configured to provide the suggested repair to a maintenance system, thereby causing the second single route component to be repaired.

In another example, a method for maintaining a gas turbine engine component includes training a maintenance schedule module via receiving a set of measured parameters for each gas turbine engine component in a set of single route gas turbine engine components, wherein each single gas turbine engine component has been exposed to a substantially identical route for a substantially identical duration, generating a variation model of the set of single route gas turbine engine components, determining a simulated response of each of the single route gas turbine engine components within a simulated engine model, and correlating variations in the set of parameters for each of the single route gas turbine engine components in the set of single route gas turbine engine components with a set of the predicted wear patterns of each gas turbine engine component in the set of single route gas turbine engine components, thereby generating a predictive model based on the variations, wherein the predictive model is configured to predict an expected wear pattern, and generating a maintenance schedule for a second gas turbine engine component, substantially identical to each gas turbine engine component in the set of single route gas turbine engine components.

In another example of the above method, the maintenance schedule includes a suggested repair method based on the determined predicted wear pattern.

In another example of any of the above methods, the maintenance schedule includes a suggested specific repair operation based on the determine predicted wear pattern.

Another example of any of the above methods further includes performing the suggested specific repair operation on the second gas turbine engine component.

In another example of any of the above methods the set of single route gas turbine engine components includes at least 25 gas turbine engine components.

In another example of any of the above methods the set of single route gas turbine engine components includes at least 200 gas turbine engine components.

In another example of any of the above methods each of the gas turbine engine components in the set of single route gas turbine engine components is manufactured using a single manufacturing process.

In another example of any of the above methods the second gas turbine engine component is operated on the same single route as each single route gas turbine engine components in the set of single route gas turbine engine components.

In another example of any of the above methods the predictive model includes a set of mathematical functions, each of which relates at least two parameters of the set of measured parameters for each gas turbine engine component.

These and other features of the present invention can be best understood from the following specification and drawings, the following of which is a brief description.

DETAILED DESCRIPTION

Figure 1:
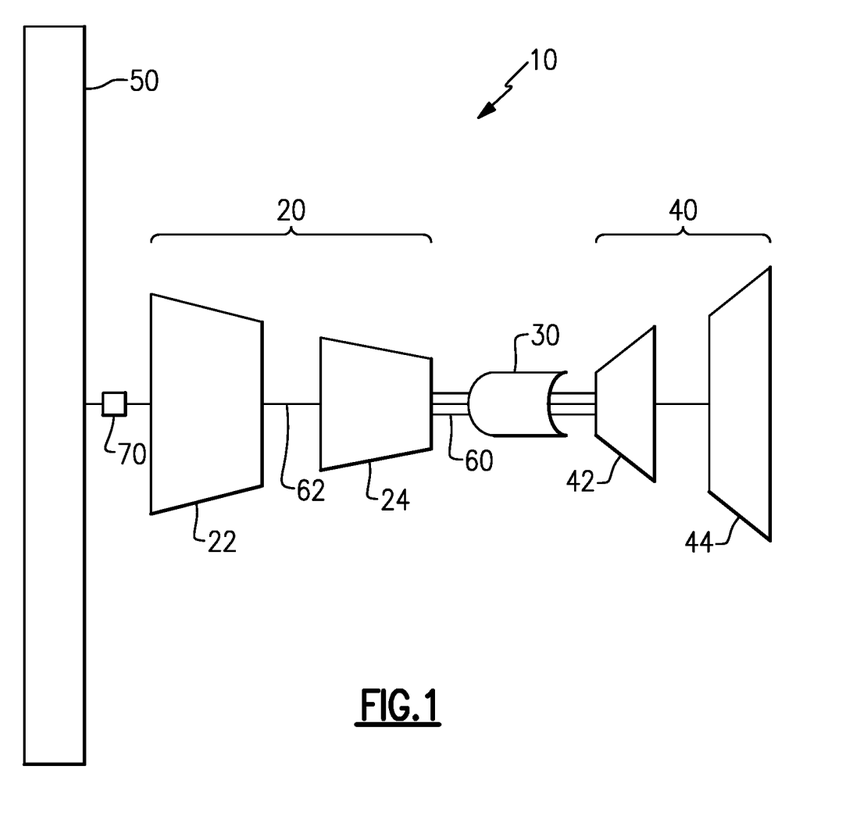
FIG. 1 illustrates a high level schematic view of an exemplary gas turbine engine.

FIG. 1 schematically illustrates a gas turbine engine 10 including a compressor section 20, a combustor section 30, and a turbine section 40. Positioned fore of the compressor section 20 is a fan 50. The compressor section 20 includes a low pressure compressor 22 and a high pressure compressor 24. Similarly, the turbine section 40 includes a high pressure turbine 42 and a low pressure turbine 44. The high pressure turbine 42 is connected to the high pressure compressor 24 via a first shaft 60 and rotation of the high pressure turbine 42 drives rotation of the high pressure compressor 24. Similarly, the low pressure compressor 22 is connected to the low pressure turbine 44 via a second shaft 62 and the rotation of the low pressure turbine 44 drives rotation of the low pressure compressor 22. In the example engine 10 of FIG. 1, the fan 50 is connected to, and driven by, the first shaft 62 via a gear system 70.

One of skill in the art will appreciate that in alternative examples, an alternative number of turbines 42, 44 and compressors 22, 24 can be utilized and still achieve similar results. Similarly, the fan 50 can be driven via a direct connection to the shaft 62 instead of the geared system 70, or driven in any other known manner.

Each of the fan 50, the compressors 22, 24 and the turbines 42, 44 are constructed from multiple substantially identical components which can include rotor blades, vanes, blade outer air seals, and the like. Each component is constructed according to a set of multiple design parameters. Each of those design parameters is given a range of acceptable values to account for manufacturing variations, as well as tolerances with the engine structure.

Existing component qualification systems determine the as-manufactured dimensions of each manufactured component, compare the measured dimensions of the manufactured component to the design dimensions, including tolerances, and determine that the component is "acceptable" when every parameter falls within the as designed specification. The type of manufacturing process used to make the part, and the relationship between each measured parameter and each other measured parameter is not included within the existing analysis. In some examples, such as those where the manufacture of each component is particularly expensive, unqualified components are manually reviewed to determine if the component may still be acceptable for use within an engine despite including one or more parameter that is outside of the as designed tolerances. In alternative examples, the unqualified component can be scrapped or reworked to meet tolerances.

Figure 2A:
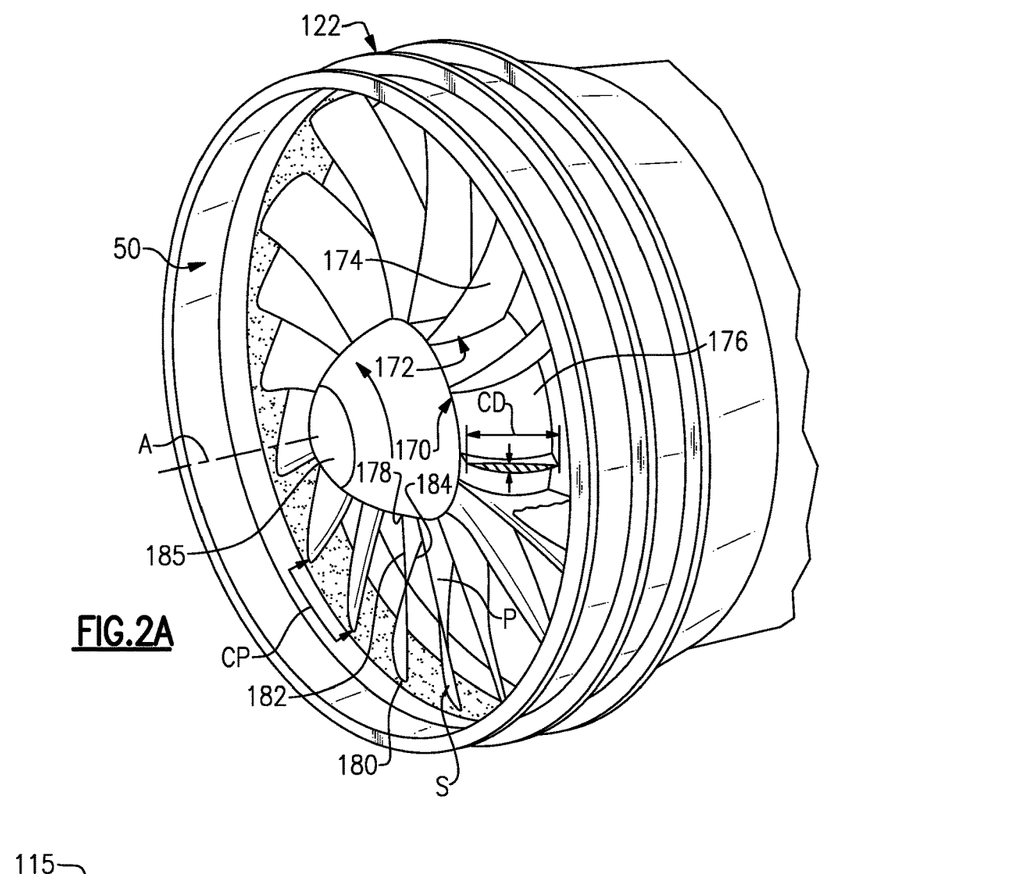
FIG. 2A is a perspective view of a fan section of the engine of FIG. 1.
Figure 2B:
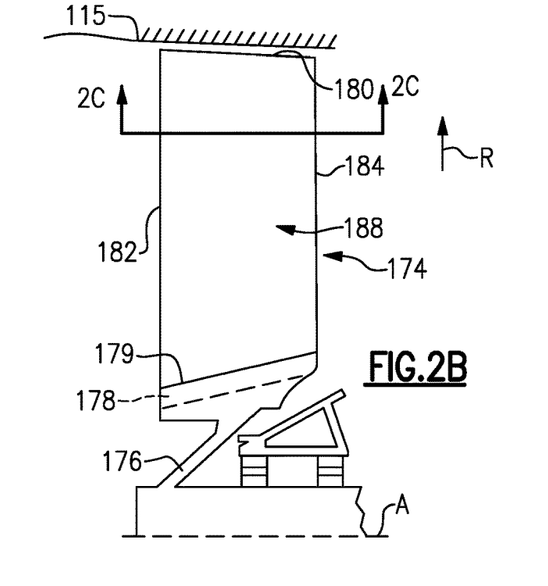
FIG. 2B is a schematic cross-sectional view of the fan section of FIG. 2A.
Figure 2C:
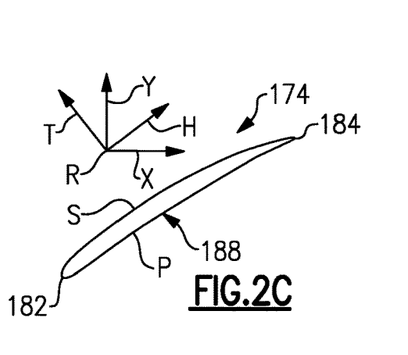
FIG. 2C is a schematic view of a cross-section of an airfoil of FIG. 2B sectioned at a particular span position and depicting directional indicators.

One such component in the example of FIG. 1 is the fan 50. Referring to FIGS. 2A-2C, the fan 50 includes a rotor 170 having an array or row 172 of airfoils or blades 174 that extend circumferentially around, and are supported by, the fan hub 176. Any suitable number of fan blades 174 may be used in a given application. The hub 176 is rotatable about the engine axis A. The array 172 of fan blades 174 are positioned about the axis A in a circumferential or tangential direction Y. Each of the blades 174 includes an airfoil body that extends in a radial span direction R from the hub 176 between a root 178 and a tip 180, in a chord direction H (axially and circumferentially) between a leading edge 182 and a trailing edge 184 and in a thickness direction T between a pressure side P and a suction side S.

Each blade 174 has an exterior surface 188 providing a contour that extends from the leading edge 182 aftward in a chord-wise direction H to the trailing edge 184. The exterior surface 188 of the fan blade 174 generates lift based upon its geometry and directs flow along the core flow path and bypass flow path. The fan blade 174 may be constructed from a composite material, or an aluminum alloy or titanium alloy, or a combination of one or more of these. Abrasion-resistant coatings or other protective coatings may be applied to the fan blade 174.

A chord, represented by chord dimension (CD), is a straight line that extends between the leading edge 182 and the trailing edge 184 of the blade 174. The chord dimension (CD) may vary along the span of the blade 174. The row 172 of blades 174 also defines a circumferential pitch (CP) that is equivalent to the arc distance between the leading edges 182 or trailing edges 184 of neighboring blades 174 for a corresponding span position. The root 178 is received in a correspondingly shaped slot in the hub 176. The blade 174 extends radially outward of a platform 179, which provides the inner flow path. The platform 179 may be integral with the blade 174 or separately secured to the hub 176, for example. A spinner 185 is supported relative to the hub 176 to provide an aerodynamic inner flow path into the fan section 122.

Figure 3A:
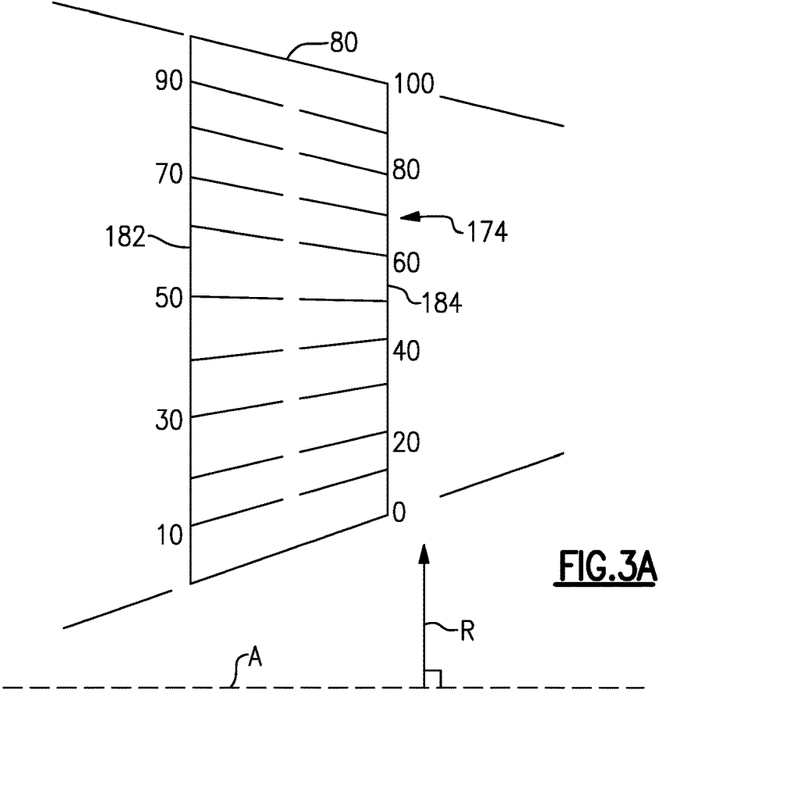
FIG. 3A is a schematic view of airfoil span positions.
Figure 3B:
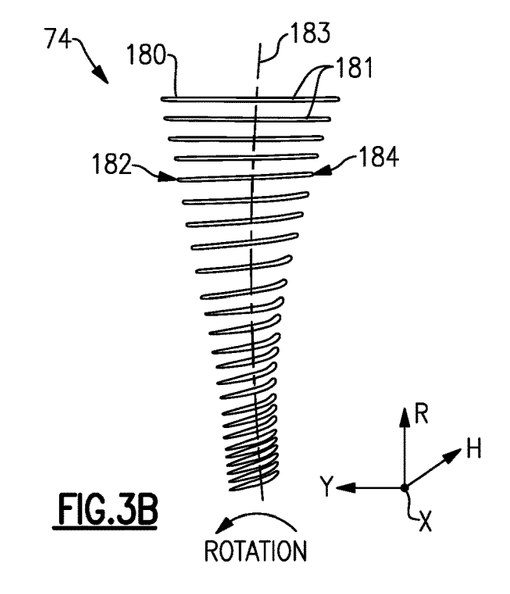
FIG. 3B is a perspective view of sections of the airfoil of FIG. 2A at various span positions.

Referring to FIGS. 3A-3B, span positions are schematically illustrated from 0% to 100% in 10% increments to define a plurality of sections 181. Each section at a given span position is provided by a conical cut that corresponds to the shape of segments the bypass flowpath or the core flow path, as shown by the large dashed lines (shown in FIG. 3A). In the case of a fan blade 174 with an integral platform, the 0% span position corresponds to the radially innermost location where the airfoil meets the fillet joining the airfoil to the platform 179. In the case of a fan blade 174 without an integral platform, the 0% span position corresponds to the radially innermost location where the discrete platform 179 meets the exterior surface of the airfoil (shown in FIG. 2B). A 100% span position corresponds to a section of the blade 174 at the tip 80.

In some examples, each of the blades 174 defines a non-linear stacking axis 183 (shown in FIG. 3B) in the radial direction R between the tip 180 and the inner flow path location or platform 179. For the purposes of this disclosure, "stacking axis" refers to a line connecting the centers of gravity of airfoil sections 181. In some examples, each fan blade 174 is specifically twisted about a spanwise axis in the radial direction R with a corresponding stagger angle at each span position and is defined with specific sweep and/or dihedral angles along the airfoil 174. Airfoil geometric shapes, stacking offsets, chord profiles, stagger angles, sweep, dihedral angles, and surface shape in an X, Y, Z coordinate system, among other associated features, can be incorporated individually or collectively to improve characteristics such as aerodynamic efficiency, structural integrity, and vibration mitigation, for example.

Figure 3C:
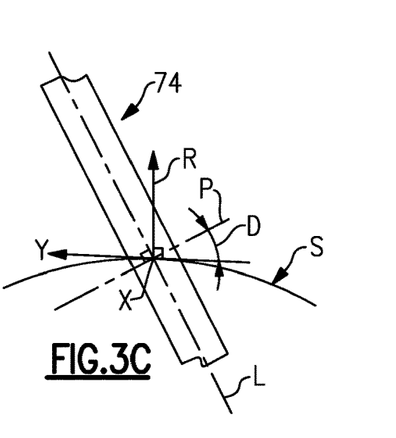
FIG. 3C is a schematic representation of a dihedral angle for an airfoil.

In some examples, the airfoil 174 defines an aerodynamic dihedral angle D (simply referred to as "dihedral") as schematically illustrated in FIG. 3C. An axisymmetric stream surface S passes through the airfoil 174 at a location that corresponds to a span location (FIG. 3A). For the sake of simplicity, the dihedral D relates to the angle at which a line L along the leading or trailing edge tilts with respect to the stream surface S. A plane P is normal to the line L and forms an angle with the tangential direction Y, providing the dihedral D. A positive dihedral D corresponds to the line tilting toward the suction side (suction side-leaning), and a negative dihedral D corresponds to the line tilting toward the pressure side (pressure side-leaning).

As can be seen, each individual fan blade 174 defines multiple parameters such as chord dimension, radial span length, thickness, contour, circumferential pitch, stacking axis, stagger angle, sweep angle, and dihedral angle. Further, many of the example parameters as well as additional parameters can be required to meet tolerances at each of multiple span positions resulting in a substantial number of parameters, any one of which can disqualify the fan blade 174 if it is out of tolerance range under existing manufacturing processes. The design of a part such as the blade determines the manufacturing requirements that should be adhered to by a vendor constructing the blade. The design blue print dimensions are a design mean $\mu_d$ that the vendor must match when producing the part. The standard deviation for the design is $\sigma_d=0$, for a certain nominal design durability or nominal part life with the nominal design durability or the nominal part life being determined via any conventional process.

Manufacturing variations typically adhere to a normal distribution (N($\mu$, $\sigma$), about the mean $\mu=\mu_d$. When a part is exposed to an operational environment, such as the single route environments discussed herein, the part can change shape due to any number of factors including foreign object damage (FOD), material internal flaws (MF), or environmental and temperature induced reactions. The exposure to operational conditions causes a deviation from the nominal manufactured shape and leads to a degraded performance. The particular deviations for some components can be highly dependent on the operational environment and similar components can require substantially different maintenance depending on the actual usage of a specific component.

While described above with regards to the fan 50, and individual fan blades 174, it should be understood that similar parameters exist for any given blade and/or vane utilized through the engine 10, including those within the compressor section 20, and the turbine section 40. Further, any number of other engine components can have similar numbers of parameters, all of which must be within tolerance, even if the parameters of the given component are not the same as the airfoil parameters described above. It is further recognized that normal wear, or wear as the result of damaging events, can impact the parameters of a fan blade that has been put in service in an engine. As a result of the wear, the fan blade can become disqualified, and a repair operation may be necessary to repair the blade. Further, when an engine including a given component is exposed to a specific wear condition (e.g. a specific aircraft route) repeatedly, the component will experience similar wear as other substantially identical components exposed to that wear condition.

With regards to any given specific component the cumulative performance criteria of the component drives part acceptance rather than adherence to any one particular parameter tolerance or set of parameter tolerances. The cumulative performance is driven by individual shapes and construction, as well as the relationships between individual shapes and constructions.

Under current manufacturing or repair processes, if any of the above described parameters, or any similar parameters that may be necessary for a given component, are out of tolerance at any single point the component will fail inspection (be disqualified) and either be scrapped or provided to an engineering team for manual review. Further it should be understood that the above described parameters are merely exemplary parameters of a fan blade 174, and practical components can include more and different parameters that are subjected to the same level of analysis when qualifying the component.

With reference to each of FIGS. 1-3C, disclosed herein is an improved system and process for maintaining manufactured parts based on the totality of the part configuration and the expected wear due to expected usage of the manufactured parts, rather than individually based on each parameter at each location on the component. In some examples, one or more parameter may be out of tolerance either due to manufacturing variance or due to wear, but when the component is considered as a whole the part is still in an acceptable configuration. Further exacerbating this is the fact that different manufacturing techniques for any given component (e.g. additive manufacturing vs. casting) can result in different acceptable configurations, or different wear patterns, that may include one or more parameter outside of the as designed tolerances. Similarly, different usages of a component (e.g. long-haul cross transoceanic flights vs short haul intracontinental flights) can result in distinct wear patterns with varying maintenance requirements. Under existing systems, the maintenance schedule is determined according to a worst case wear scenario, without specific regards to the type of wear associated with the specific usage.

In order to ensure overall engine performance meets minimum requirements, a customized repair of the parts is done periodically during scheduled maintenance of the engine. The customized repair procedures ensure that the part and design shape conform to the dimensional requirements described above. However, given the extreme conditions single route parts may be exposed to, the timing required between customized repairs, and the types of customized repairs required can vary dramatically from route to route. The repair mechanisms and schedules should be designed to accommodate individual repair needs and service intervals of a given specific single route component or single environment aircraft.

With continued reference to FIGS. 1-3C, FIG. 4 schematically illustrates an exemplary system 300 for analyzing a batch of single route parts in order to determine an optimized maintenance schedule. Initially a set of single route parts that were manufactured using a single manufacturing process or uniform combination of processes is identified in an identify single route parts step 310. As used herein, single route parts refers to a set of substantially identical components that are used on a single repeated flight route or set of flight routes. In some examples, the single repeated flight route can be a repeatedly run distance, in other examples the single repeated flight route can be a repeatedly run region, and in other examples the single repeated flight route can be a combination of the two. Once a sufficient number of the single route parts have been identified, each parameter of each of the single route parts is measured in an inspect parts step 320 after having been operated for a predetermined amount of flight hours. The inspect parts step 230 can be performed over a substantial period of time, as components are removed from aircraft engines during standard maintenance.

Figure 4:
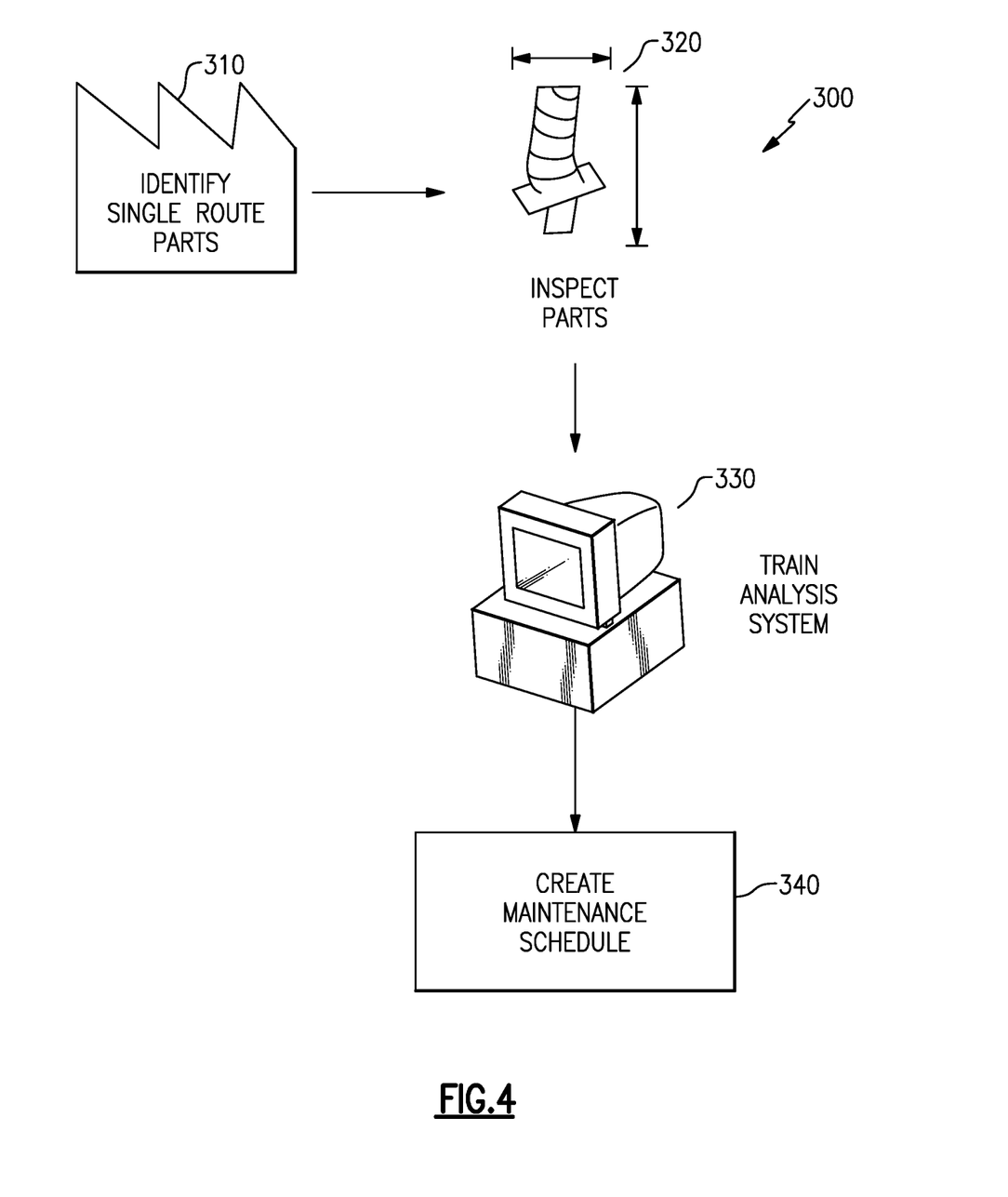
FIG. 4 schematically illustrates an exemplary system for developing and analyzing a batch of manufactured parts in order to create a maintenance schedule.

The output of the inspect parts step 320 is a data set that includes a measurement of each parameter of each single route part in the identified set. The single route data set is then provided to a computer system and is used by the computer system to train a part analysis in a "train analysis system" step 330 within the train analysis step 330. The computer system develops a variance model that models the variations of an average, or exemplary single route part, for the specific manufacturing process or processes and the specific wear case of the single route for the identified single route part set, based on the set of measured single route parts. Contemporaneously with the variance model, the computer system develops a predictive model, that can predict the change to the behavioral characteristics, such as efficiency, bending, vibration, etc. of a given component based on the specific single route that that component is utilized in. In some examples, the predictive model can be predetermined by performing a similar process on the as-manufactured parts prior to inclusion of the parts within an operating engine. This change is a deviation from the design dimensions and the design intent of the part and increases over time.

The variation model is a dimension reducing model, and describes a large number of observable variables' values using a smaller number of independent, latent variables. A latent variable is a variable whose value depends on our understanding of the latent structure inside the observed data. The latent structure of the data can only be determined from correlation analysis of the observed variables, and the correlation analysis requires observations of multiple as-manufactured parts. The usage of the single route measurements of the set of single route components to create the variance model and the predictive model can be referred to as a principal component analysis (PCA), and provides an accurate model of the actual wear patterns expected from a single specific route. In some examples, the predictive model is a Gaussian Process (GP) model.

Based on the predictive model, and the variance model, the computer system then creates a maintenance schedule in a "create maintenance schedule" step 340. The maintenance schedule compares a function, or set of functions, that defines an acceptable component based on all of its parameters to the expected wear pattern for the single route, and determines the longest on-wing time for the single route component before maintenance is required due to the expected wear pattern. By applying the maintenance schedule to an individual single route part, the computer system can automatically determine a maintenance timing, and expected maintenance operation, in order to maintain the single route part within qualification parameters. Due to the number of parameters (in some cases the number of parameters can exceed 20), and the number of positions on the part where each parameter is to be measured, the functions determined by the computer system are high order functions, and determining whether an individual component meets the functions would be prohibitively time consuming if performed manually.

Figure 7:
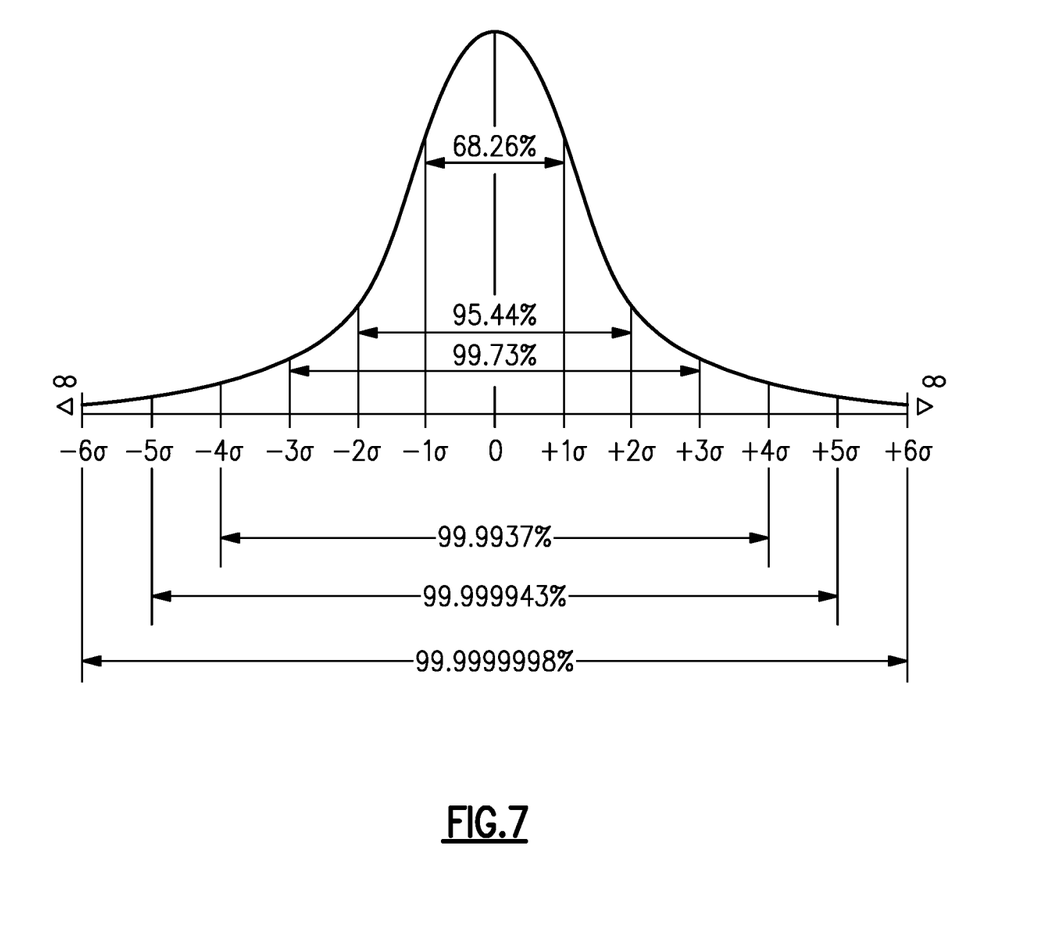
FIG. 7 schematically illustrates an exemplary distribution including standard deviations.

Parts analyzed using the process described herein adhere to the design intent mean and accepted tolerances that would allow efficient assembly of the component. Typically each part is required to adhere to its design intent, with some variations being acceptable as described above. By way of example, the acceptable variations should be within a 3G criteria and thus are expected to fall within an exemplary distribution illustrated in FIG. 7. Typically, the parts should fall within the 99.73% region of the normal distribution as per the design intent in order to ensure that part life and component performance metrics are met. As the part or component is introduced into the field, the operational environment effects lead to a deterioration of the component which manifests as a further deviation from the norm.

The analysis described above allows an operator to analyze the deterioration (derivation from normal) of multiple parts over time, and correlate that deterioration with given operational environments. Based on the determined correlations between the deterioration and the single route, a maintenance schedule can be determined corresponding to a given specific single route with the maintenance schedule allowing for each part to be analyzed for compliance and reworked if necessary at the correct intervals.

With continued reference to FIGS. 1-4, FIG. 5 schematically illustrates the "train analysis" step 330 of FIG. 4. Initially, during the train analysis step 330, the computer system receives all of the measured parameters of each component in the set of single route components in a receive measured parameters step 410. In some examples, the computer system can further determine one or more derived parameter based on a combination or manipulation of one or more of the measured parameters. As described above, each of the single route components in the data set is measured at the same, or similar, number of flight hours.

Figure 5:
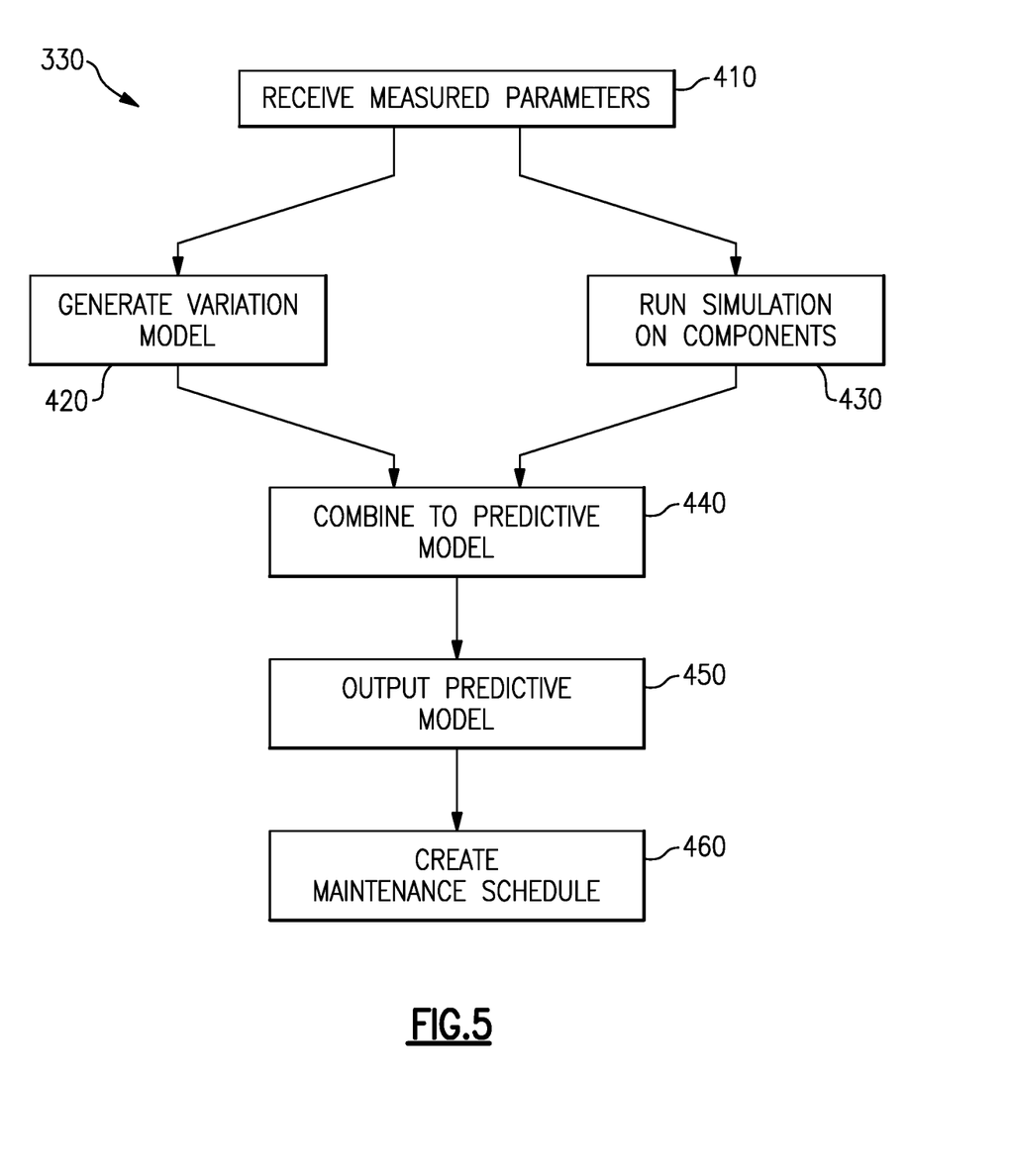
FIG. 5 schematically illustrates a train analysis step for utilization in the process of FIG. 4.

The full data set is passed to a generate variation model operation 420 and a run simulation on components operation 430. During the generate variation model step 420, the computer system determines a single variation model representative of the possible and/or expected variations of the single route component resulting from the particular wear case of the set of single parts. The variation model is representative of the general wear of all of the single route parts in the entirety of the batch. The variation model further represents the expected wear pattern of all other substantially identical components that have approximately the same number of flight hours and have been utilized on the same repeated route. The variation model can include an average figure, standard deviations, tolerances, and the like and be determined using any known process.

During the run simulation on components process 430, the computer system iteratively runs a simulation where each of the single route components is incorporated into a simulated engine, and a computer simulation is run to determine how the single route component is expected to operate within a mathematical model of the engine. The results of the simulation for each single route component are compared and the variations in the parameters between each single route component and each other single route component are correlated with variations in the operation of the corresponding simulation results.

Once the simulation results are completed, the process moves to a combine to predictive model step 440. The correlated variations from the simulation results are applied to the variation model generated in the generate variation model step 420 in order to determine a predictive model. The generated predictive model provides a prediction of how a component will wear over time if it is used along the single route, including the wear at fewer flight cycles and greater flight cycles than the number of flight cycles of the training set. In some examples, the predictive model can include a Gaussian process. Once generated, the predictive model is output to the computer system in an output predictive model step 450.

Once the predictive model has been output to the computer system, the computer system uses the predictive model to create a maintenance schedule which can be applied to any substantially identical component created using the same manufacturing process, and exposed to the same single route, as the set of single route components used to train the analysis. As used herein a "maintenance schedule" for a component refers to the frequency that the component is removed for maintenance. In some examples, the maintenance schedule can also include specifically scheduled operations, such as a blending operation, based on the expected wear pattern that the single route component will be exposed to. The maintenance schedule is determined by one or more mathematical functions, each of which relates multiple parameters of the single route component to each other and generates a corresponding output value. In a typical example each of the functions within the maintenance schedule is determined at least partially by a higher order function.

As described herein, the train analysis step 330 utilizes a set of single route components, all of which are manufactured using the same manufacturing process and operated on the same, or substantially similar, routes for the same or substantially similar amounts of flight hours. In some examples, the set of single route components includes at least 25 analyzed single route components. In further examples, such as ones where the system may need a greater level of accuracy in the maintenance schedule, at least 200 analyzed single route components can be utilized. In yet further examples, where additional training of the analysis is desired, an initial set of single route components can be supplemented at a later date with another set of single route components manufactured using the same process, and operated on the single route for the same number of flight hours, so as to increase the level of accuracy of the maintenance schedule.

Figure 6:
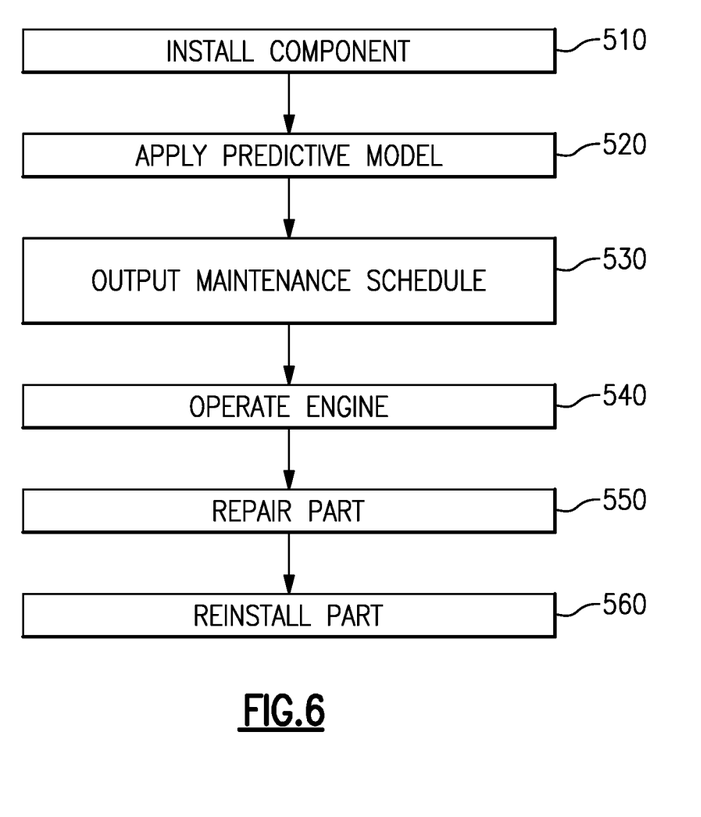
FIG. 6 schematically illustrates a process for maintaining a single route component.

With continued reference to FIG. 5, FIG. 6 illustrates a process for maintaining an aircraft component utilizing the maintenance schedule determined in the create maintenance schedule step. Initially, a substantially identical component to the previously analyzed components is analyzed and installed in an engine in an install component step 510. The analysis includes determining the as-manufactured parameters of the installed component. Once installed, the as-manufactured parameters of the installed component are applied to the predictive model output by the computer system at the output predictive model step 450 of FIG. 4 in an apply predictive model step 520.

The predictive model applies the expected wear pattern to the as-manufactured components and determines an expected amount of flight hours that the component can be operated before a repair operation is required, provided the component is utilized in the single route. The number of flight hours is output in an output maintenance schedule step 530. In some examples, the maintenance schedule output in step 530 can further include an expected repair type (e.g. blending). In yet further examples, the expected repair operation can include a specific operation of the expected repair type.

Once the maintenance schedule has been output, the engine is operated for the predetermined number of flight hours along the single flight route in an operate engine step 540. Once the predetermined number of flight hours, or other engine cycles, has elapsed, the component is removed and subjected to maintenance in a repair part step 550. In some examples, the part is repaired according to the suggested repair procedure or operation without further analyzing the part. Such examples can be utilized when the set of single route components used to train the analysis is sufficient to provide a high accuracy. By way of example, the set could include at least 200 data points. In other examples, the component is removed at the determined time and is analyzed using an as-run analysis system to determine what specific repair operations are necessary to bring the part within qualifications. Once repaired, the part is returned to the aircraft engine, and the engine is returned to operation in a reinstall part step 560.

In some examples, the repair part step 550 can optionally include analyzing the part to determine all of the measureable parameters of the single route part, and using the determined parameters to further train the analysis. In such an example, the new data from the part being maintained is added to the original data set used to train the analysis, and the training process is repeated. By using this process, the accuracy of the predicted repair can be improved, and the length of time that the component can be left in the engine can be more precisely tuned.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A maintenance scheduling system for gas turbine engine components comprising:

a computer configured to receive a set of measured parameters for each gas turbine engine component in a plurality of substantially identical gas turbine engine components, and determine a variation model based on the set of measured parameters wherein each of the gas turbine engine components is a single route component and has been utilized in a substantially identical single route, wherein the set of measured parameters includes each of chord dimension, radial span length, thickness, contour, circumferential pitch, stacking axis, stagger angle, sweep angle, and dihedral angle, each of the parameters being measured at multiple span positions, and wherein the variation model is a dimension reducing model describing observable variables' values using a smaller number of independent, latent variables;

the computer system including at least one simulated engine model, the simulated engine model being configured to determine a predicted operation of each gas turbine engine component in the plurality of substantially identical gas turbine engine components;

a first software module configured to correlate variations in the set of parameters for each of the gas turbine engine components in the plurality of substantially identical gas turbine engine components with a set of the predicted operations of each gas turbine engine component in the plurality of substantially identical gas turbine engine components, thereby generating a predictive model based on the variations, the predictive model being configured to predict at least one of efficiency, bending and vibration of a component based on actually measured parameters of the component, the actually measured parameters including all the measured parameters of in the set of measured parameters; and a second software module configured determine a predictive model operable to determine a predicted wear pattern of a second single route component, wherein the second single route component is substantially identical to the gas turbine engine components.

2. The maintenance scheduling system of claim 1, wherein the plurality of substantially identical gas turbine engine components are manufactured via a single manufacturing process.

3. The maintenance scheduling system of claim 2, wherein the second software module is configured to determine a maintenance schedule of the second single route component based on the predicted wear pattern.

4. The maintenance scheduling system of claim 3, wherein the maintenance schedule includes a length of time until the second single route component is due for maintenance.

5. The maintenance scheduling system of claim 3, wherein the maintenance schedule includes a predicted repair method, the predicted repair method being a repair method configured to place the second single route component within qualification parameters.

6. The maintenance scheduling system of claim 5, wherein the predicted repair method includes a specific repair operation.

7. The maintenance scheduling system of claim 1, wherein the plurality of substantially identical gas turbine engine components includes at least 25 substantially identical turbine engine components.

8. The maintenance scheduling system of claim 4, wherein the plurality of substantially identical gas turbine engine component includes at least 200 substantially identical turbine engine components.

9. The maintenance scheduling system of claim 1, wherein the predictive model is a set of mathematical functions, each of which relates at least two parameters of the set of measured parameters for each gas turbine engine component.

10. The maintenance scheduling system of claim 1, wherein the second software module is configured to provide the suggested repair to a maintenance system, thereby causing the second single route component to be repaired.

11. The system of claim 1, wherein the variation model models variations of a single route gas turbine engine components for the specific manufacturing process and the specific wear case of a single route for the identified plurality of substantially identical gas turbine engine components, based on the measured plurality of substantially identical gas turbine engine components.

12. A method for maintaining a gas turbine engine component comprising:

training a maintenance schedule module via receiving a set of measured parameters for each gas turbine engine component in a set of single route gas turbine engine components, the set of measured parameters includes each of chord dimension, radial span length, thickness, contour, circumferential pitch, stacking axis, stagger angle, sweep angle, and dihedral angle, each of the parameters being measured at multiple span positions, wherein each single gas turbine engine component has been exposed to a substantially identical route for a substantially identical duration, generating a variation model of the set of single route gas turbine engine components, wherein the variation model is a dimension reducing model describing observable variables' values using a smaller number of independent, latent variables, determining a simulated response of each of the single route gas turbine engine components within a simulated engine model, and correlating variations in the set of parameters for each of the single route gas turbine engine components in the set of single route gas turbine engine components with a set of the predicted wear patterns of each gas turbine engine component in the set of single route gas turbine engine components, thereby generating a predictive model based on the variations, wherein the predictive model is configured to predict an expected wear pattern; and generating a maintenance schedule for a second gas turbine engine component, substantially identical to each gas turbine engine component in the set of single route gas turbine engine components.

13. The method of claim 12, wherein the maintenance schedule includes a suggested repair method based on the determined predicted wear pattern.

14. The method of claim 12, wherein the maintenance schedule includes a suggested specific repair operation based on the determine predicted wear pattern.

15. The method of claim 13, further comprising performing the suggested specific repair operation on the second gas turbine engine component.

16. The method of claim 12, wherein the set of single route gas turbine engine components includes at least 25 gas turbine engine components.

17. The method of claim 16, wherein the set of single route gas turbine engine components includes at least 200 gas turbine engine components.

18. The method of claim 12, wherein each of the gas turbine engine components in the set of single route gas turbine engine components is manufactured using a single manufacturing process.

19. The method of claim 18, wherein the second gas turbine engine component is operated on the same single route as each single route gas turbine engine components in the set of single route gas turbine engine components.

20. The method of claim 12, wherein the predictive model includes a set of mathematical functions, each of which relates at least two parameters of the set of measured parameters for each gas turbine engine component.

21. The method of claim 12, wherein each parameter of each gas turbine engine component in the set of single route gas turbine engine is measured after having been operated for a predetermined amount of flight hours.

22. The method of claim 12, wherein the variation model provides an average variation and specific wear case of the set of single route gas turbine engine components based on the measured parameters of the set of single route gas turbine engine components.

* * * * *